May 23, 1950 R. H. DICKE 2,508,451

SOUND RECORDING AND REPRODUCING APPARATUS

Filed May 2, 1947 2 Sheets-Sheet 1

Inventor

Robert H. Dicke

By

Oscar H. Dicke

His Attorney

May 23, 1950 R. H. DICKE 2,508,451

SOUND RECORDING AND REPRODUCING APPARATUS

Filed May 2, 1947 2 Sheets-Sheet 2

Inventor
Robert H. Dicke
By
Oscar H. Dicke
His Attorney

Patented May 23, 1950 2,508,451

UNITED STATES PATENT OFFICE 2,508,451

SOUND RECORDING AND REPRODUCING APPARATUS

Robert H. Dicke, Princeton, N. J.

Application May 2, 1947, Serial No. 745,438

19 Claims. (Cl. 179—100.3)

This invention relates to a sound recording and reproducing apparatus of the sound film photographic type and more particularly to a construction in which a record is made of durations of specific frequencies and their phase rather than a record of the wave form of a complex sound wave.

An object of the present invention resides in the provision of recording and reproducing apparatus which can faithfully record and reproduce music, speech or other sounds by the employment of record film tape or other recording medium moving at a comparatively low speed.

Another object of the present invention resides in the provision of recording and reproducing apparatus characterizing a large number of frequencies together with separate means for detecting such frequencies in the process of recording the sound and in re-enacting such frequencies in the process of reproducing the sound.

Another object of the present invention resides in the provision of recording and reproducing apparatus which separates sounds into various components and in recording and reproducing these components through the medium of a large number of sound tracks in multiple, one sound track for each principal component.

More specifically it is proposed to convert composite sound waves into current intensity waves, to convert these current intensity waves into light intensity waves, to pass these light intensity waves through a plurality of light modulators and then upon a plurality of photographic sound tracks moving at a low speed as a result of which average intensity exposures are made on each of these sound tracks depending on the frequency and phase relationship of components of these light intensity waves and the closely frequency related light modulations produced by the light modulators, in passing the photographic sound tracks, after development, through light beams modulated at frequencies corresponding to the frequencies of such modulators to thereby produce light modulations corresponding to said components, to combine all of these modulations into a composite light modulation and convert this composite light modulation into a composite sound modulation corresponding to the original composite sound modulation.

Other objects, purposes and characteristic features of the present invention will be pointed out in the description which follows and will in part be obvious from the accompanying drawings in which.

*General description*

Figure 1:
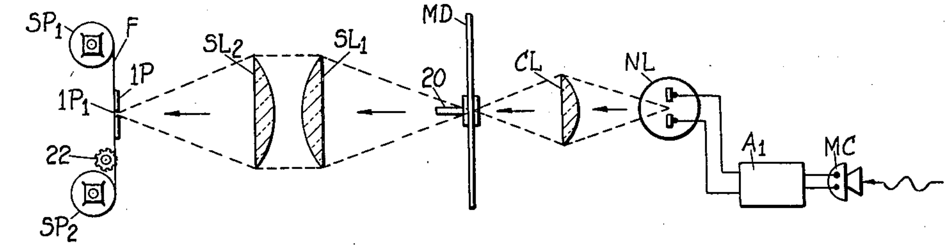
Fig. 1 illustrates conventionally, in side elevation, recording apparatus embodying the present invention.

Refer to Fig. 1, wherein there is shown in schematic form a recording mechanism embodying the present invention. In this structure the sound, which may be any voice or music, enters the microphone MC and produces an electrical signal which is amplified by the amplifier A1. The output circuit of the amplifier A1 (assumed to be of high impedance) causes current to flow to a neon light bulb NL to have its emitted light vary its intensity in accordance with this output current. This circuit is so designed that the neon bulb normally glows at about half intensity and either increases or decreases its intensity in accordance with a particular direction of displacement of the diaphragm of the microphone MC.

The light from the neon bulb NL is brought to a line focus on the modulating wheel or disk MD. The modulating disk preferably is a photographic glass or transparent plastic plate upon which has been photographed a series of concentric rings the nature of which will be discussed later. The glass disk MD is mounted on a shaft 20 which in turn is driven through means preferably including a motor M (see Fig. 2). The light from the neon lamp NL before and after passing through the modulating disk MD traverses lens systems, preferably including a cylindrical lens CL and spherical lenses $SL_1$ and $SL_2$, and falls upon an opaque screen IP containing a narrow slit $IP_1$. The photographic film F (which may be assumed to be of the 16 mm. or 32 mm. movie variety) is caused to move past this slit $IP_1$, and preferably in a direction at a right angle thereto, at a comparatively slow speed and by means of a sprocket 22 driven by the shaft 23, which shaft 23 also drives the modulating wheel MD and is driven by the motor M. The lens system between the modulating disk MD and the film F, and including lenses $SL_1$ and $SL_2$, is assumed to be so positioned that an image of a portion of the modulating disk MD is thrown upon the film F via the exposure slit $IP_1$.

Figure 2:
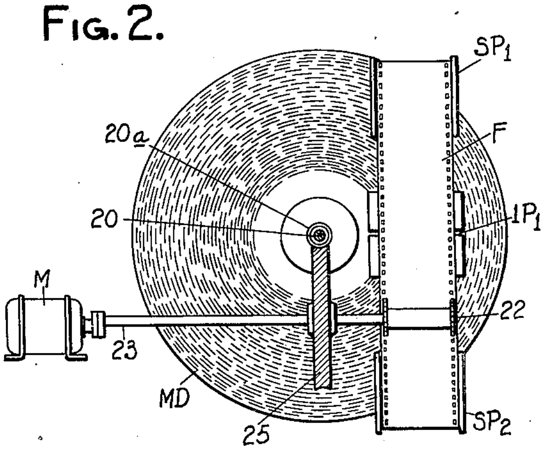
Fig. 2 illustrates an end view, as viewed from the left, of the apparatus illustrated in Fig. 1 with the motor for driving the modulating disk and the film added thereto.
Figure 3:
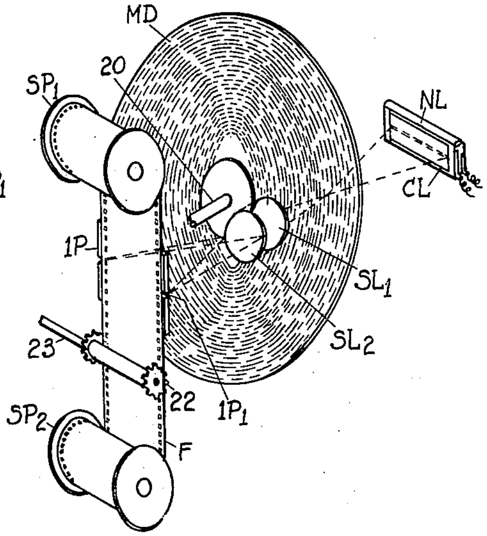
Fig. 3 illustrates, in perspective, a large part of the apparatus illustrated in Fig. 1.

Fig. 2 is an end view of the recorder of Fig. 1 showing the photographic film F, exposure slit $IP_1$, and the modulator wheel MD and also the driving motor M. Fig. 3 is a perspective view of the apparatus shown in Figs. 1 and 2.

Figure 4:
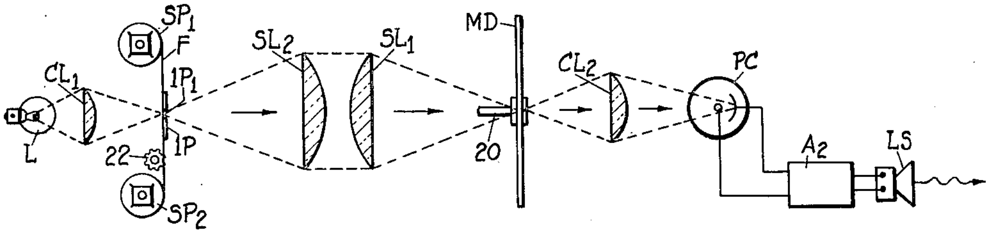
Fig. 4 illustrates conventionally, in side elevation, reproducing apparatus which reproduces speech, music or other sounds from a sound track on which a record has been made optically by the apparatus illustrated in Figs. 1, 2 and 3.

Fig. 4 is a schematic view of a reproducer whose function it is to reproduce the sound after the film F has been developed. Generally speaking, the reproducer is the same as the recorder Figs. 1, 2 and 3 except for a few slight differences. It will be noted that a steady light source L has been added at the left in Fig. 4 and that the neon glow bulb NL of Figs. 1 and 3 has been replaced by a photo cell PC which drives an amplifier $A_2$ feeding a loud speaker LS.

Figures 5, 6, 7, 8:
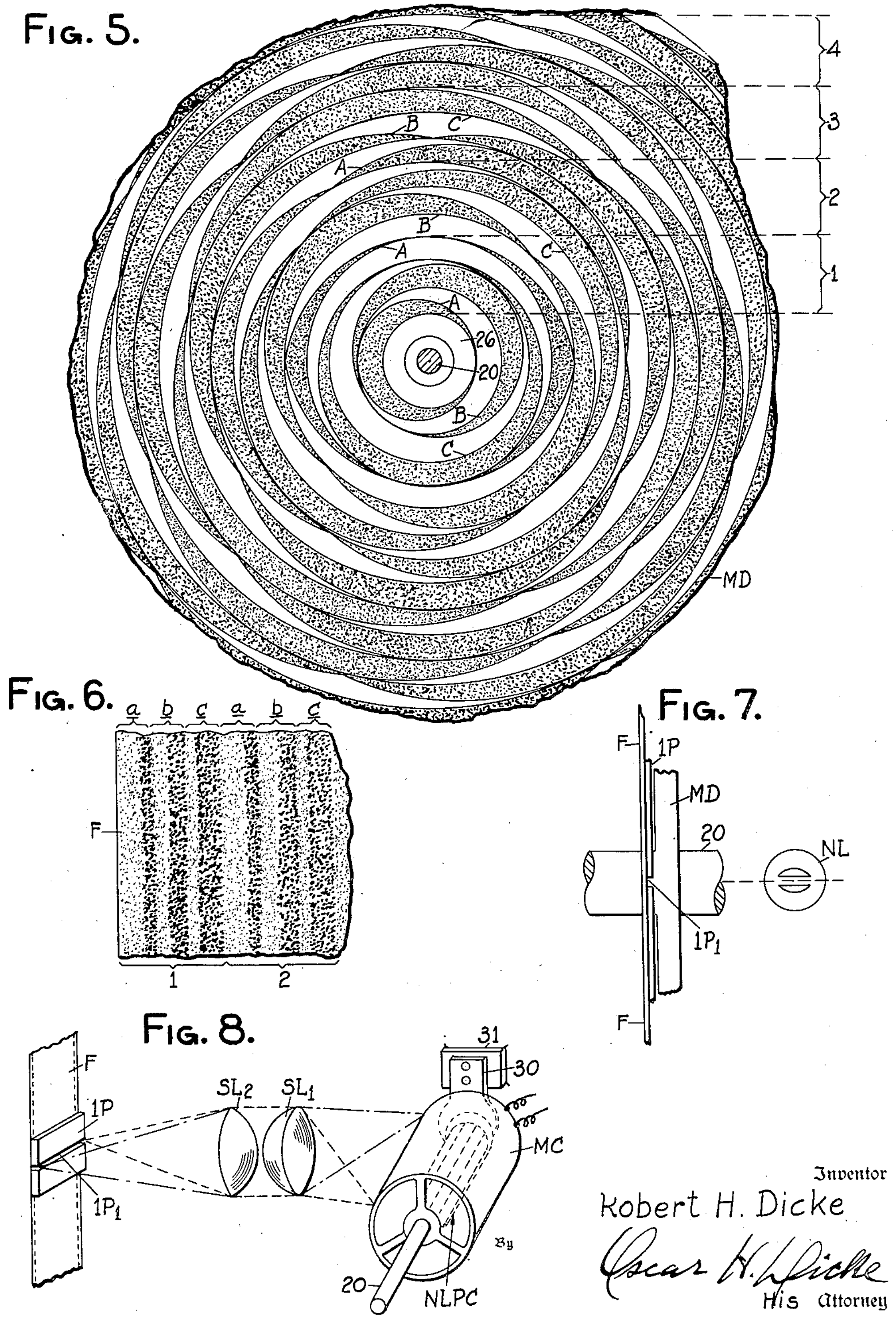
Fig. 5 illustrates an inner small portion of the modulating disk, greatly magnified, illustrated in Figs. 1, 2 and 3 of the drawings. An identical modulating disk is used in the reproducing apparatus illustrated in Fig. 4.
Fig. 6 illustrates a small portion of the photographic film magnified greatly to show two sound tracks 1 and 2 each including three sub-tracks *a*, *b* and *c* made under conditions when no sound entered the microphone.
Fig. 7 shows, very schematically, a side elevation of a modified form of the invention.
Fig. 8 illustrates, in perspective, a second modification of the invention.

Fig. 5 shows the inner portion of the modulating disks MD of Figs. 1 or 4 and including the inner twelve bands which serve as light modulators for modulating the light beam. The modulating disk MD contains a large number of these bands all concentric with the center of the disk. It will be noted from Fig. 5 that each modulating track 1, 2, 3 or 4 is composed of three sub-tracks A, B and C, each of which sub-tracks has its transparent portion shifted by 120° (harmonic angle) from the previous one, and that each of these sub-tracks undergoes a sinusoidal variation in average opaqueness density along its path. The three modulators constituting the three sub-tracks on the rotating disk thus produce zero modulation of constant light, but if the light modulated is of a frequency near that of the modulator frequency the exposure is shifted from sub-track to sub-track on the film at a beat frequency rate. There is a large number of these modulating tracks, possibly one hundred, each having three sub-tracks and each modulating at a different frequency.

As specifically shown in Fig. 5, this average opaqueness density constitutes a black (opaque) sinusoidal wave. In practice, a partial opaque condition may extend over the entire sub-band width and the degree of opaqueness may vary sinusoidally, or, if desired, the sinusoidal modulated area may be partially opaque only. It is impossible to illustrate this partial opaqueness of the modulating disk in an ink drawing. It will be observed that the sub-tracks A, B and C of track 1 have a single modulation per revolution, the sub-tracks A, B and C of track 2 have two sinusoidal modulations per revolution and the sub-tracks A, B and C of sound track 3 have three sinusoidal modulations per revolution on the modulating disk. The center track 26 of the modulating disk MD is preferably gray (medium density opaqueness) and is unmodulated. This track 26 is provided to enable frequencies to be recorded that are lower than the frequency of modulation created by sound track 1. These low frequencies will then be directly recorded and reproduced without superimposed mechanical modulation.

*Qualitative operation*

Referring to Fig. 1, the sound is electrically picked up by the microphone MC, amplified by amplifier A1 and converted into fluctuating light intensity by the neon glow bulb NL. This fluctuating light emitted by the neon lamp NL before it passes through the modulating disk MD, is brought to a line focus thereon, which line focus through the medium of the lenses $SL_1$ and $SL_2$ has its image placed on the film exposure slit $IP_1$.

Each particular modulating sub-track of each of tracks 1, 2, 3, or 4, etc. of the modulator wheel MD is focused at its own particular point along a line on the exposure slit $IP_1$. Thus, the light intensity at each of these spots along the slit $IP_1$ fluctuates in accordance with both the fluctuation of the opaqueness in that particular sub-track in the rotating modulator disk and the fluctuation of the light emitted by the glow bulb NL. Since the film F moves slow as compared with the speed of rotation of the modulating disk MD, the details of modulation of the particular frequency characterized by a particular sound track of the film is not recorded but an extent of opaqueness density conforming to the average intensity of the sound for that particular frequency and its beat frequency phase relationship with respect to the wave characterized by a particular sub-track of the modulating disk MD is recorded. In particular, if the sound contains a frequency identical with that introduced by one of the modulator sub-tracks, there will be a zero beat frequency between the two and the average value of the intensity of the light, which is of continuing intensity, will be either abnormally great or abnormally small on one sub-track depending upon the relative phase of the signal with respect to the sinusoidal wave on the modulator sub-track under consideration. Since each modulator track contains three equally spaced separate phases in its sub-tracks, it is clear that there will always be at least one darker and one brighter sub-track for the particular case when a sinusoidal sound, having a frequency exactly the same as the frequency of this modulator track, is received. Which particular one of these three sub-tracks will pass the greatest amount of light depends on the phase relationship between the original sound wave and the phase of the three sub-track frequencies of the modulator. To recapitulate, if the incoming signal frequency coincides in both frequency and phase with a modulator track frequency, there will result an abnormal darkening or brightening of light on the film at a sub-track corresponding to this frequency and phase as the result of zero beat frequency. This will in turn cause abnormally bright or dark areas on at least one of the sub-tracks of that frequency track of the film as it moves by the exposure slit. In this connection it should be remembered that if all three sub-tracks on the film for a particular frequence are of the same degree of transparency no sound will be produced since two of the sub-tracks in combination will blank out the effect produced by the third, for the same reason that balanced power transmitted over a 4-wire, 3-phase power system will cause zero current flow in the neutral wire. Also, during reproduction the abnormally bright film track will cause the corresponding track of the modulating disk of the reproducer to re-enact this particular frequency.

Referring now to Fig. 4, if this film containing the light and dark streaks on its sub-tracks is run through the reproducer, this particular frequency will be reproduced as the abnormally large amount of the light of one particular phase is no longer completely balanced by the other two phases or sub-tracks and therefore, one phase of modulation by the modulator for that frequency is no longer cancelled by the other two phases as was the case when no sound entered the microphone and all three phases on the film were of the same opaqueness intensity. This is readily understood when it is remembered from analytic geometry that equally spaced rotating vectors of like magnitude cancel each other. For instance, four equal vectors spaced 90 degrees apart neutralize each other and three equal vectors spaced 120 degrees apart neutralize each other. In this connection, it should be understood that the present invention is not limited to three sound sub-tracks per frequency in that four or any other number of sound sub-tracks greater than four per sound track instead of the three shown may be used in accordance with the present invention, but in each case the sinusoidal waves on the modulating disk for each sub-track will be so placed thereon that the sum of the waves of the sub-tracks for each frequency sound track neutralize each other. In this connection, it should be observed that the sinusoidal waves of the sub-tracks A, B and C of sound track 1 of the disk portion shown in Fig. 5 are phase displaced 120 degrees, the waves of the sub-tracks of sound track 2 are phase displaced 60 degrees, the waves of the sub-tracks of sound track 3 are phase displaced 40 degrees and the waves of sub-tracks of sound track 4 are phase displaced 30 degrees. The degrees mentioned are mechanical degrees in the drawing of Fig. 5. The harmonic light waves created by rotation of the modulating disk MD are, in each case that is for each sound track, displaced in phase exactly 120 harmonic degrees.

If an incoming signal frequency, of the same frequency as the frequency of a particular sound track of the modulator disk MD, is in exact phase with the sinusoidal variation of one of the sub-tracks of this sound track of the modulator disk, then that particular sub-track portion of the film F will be exposed to a maximum insofar as average exposure is concerned, whereas if it is in exact phase opposition the exposure will be a minimum. In either case, the other two sub-tracks of the film will be somewhat less exposed (lighter negative) in the first case and somewhat more exposed in the second case (darker negative) but in both cases these two sub-tracks of the film will on an average be exposed to light to the same extent. When this film is passed through the reproducer of Fig. 4, this unbalance between the opaqueness of the three sub-tracks will cause a sound of the frequency of that modulator to be produced, which sound is in phase with the frequency produced by the modulator sub-track corresponding to the one which caused the increased exposure. If now the incoming signal is of a slightly different frequency than the frequency of the modulator track then the degree of exposure will shift from one sub-track to another in succession on the film so that when the developed film is used in the reproducer, additional phase shifting in either an additive or a subtractive direction will be continually going on to thereby reproduce the original frequency tone.

Stating this in another way, in case the incoming light is of a frequency differing slightly from the frequency of one of the modulator bands, the beat frequency will be low causing the light at three points along the exposure slot (corresponding to the three sub-tracks of this frequency band) to slowly vary from bright to dark. The phase of this variation will differ by 120° on the three sub-tracks. This will have the effect of causing the streaks on the film to vary sinusoidally in intensity along their length. In reproducing the tone by the apparatus shown in Fig. 4 this low frequency, corresponding to the original beat frequency will mix with the modulator frequency produced by the modulator disk in such a way as to give the original frequency back from the speaker.

One of the features of the present invention resides in the fact that all of the undesired frequencies that accompany the recording and audible reinstating of beat frequencies are eliminated. As pointed out above a modulator for modulating light harmonically at numerous successively higher frequency is employed. This light modulator modulates the light beam characteristic of the tones to be recorded so that the light which passes through the modulator is modulated at the beat frequency of the tone frequency and the modulator frequency. It is however, well known that if two frequencies are superimposed upon each other both "sum" and "difference" beat frequencies will result. For instance frequencies of 20 C. P. S. and 100 C. P. S. may be obtained by superimposing 40 C. P. S. and 60 C. P. S. upon each other. Furthermore, if these beat frequencies are, upon reproduction, superimposed upon the modulator frequency of, say, 60 C. P. S. the resultant frequencies of 40 C. P. S., 80 C. P. S. and 160 C. P. S. will be obtained. If now from this consideration we go farther and assume that a tone frequency of 200 C. P. S. is modulated by modulator frequencies of 180 C. P. S. and 210 C. P. S., as could very easily be the case in applicant's system, beat frequencies of 20 C. P. S., 380 C. P. S., 10 C. P. S. and 410 C. P. S., will result and if the first two upon reproduction are again modulated by the 180 C. P. S. light modulator 160 C. P. S., 200 C. P. S. and 560 C. P. S. will result and if the second two frequencies are upon reproduction again modulated by the 210 C. P. S. light modulator frequencies of 200 C. P. S., 230 C. P. S. and 620 C. P. S. will result. The total number of reproduced frequencies would therefore be 160 C. P. S., 200 C. P. S., 230 C. P. S., 560 C. P. S. and 620 C .P. S. An astounding feature of the present invention is that only the original frequency of 200 C. P. S. will be reproduced by the apparatus of the present invention, all the others being eliminated. There are two reasons why the imaginary frequencies of 160 C. P. S., 230 C. P. S., 560 C. P. S. and 620 C. P. S. are eliminated. In the first place when the 200 C. P. S. tone frequency is modulated by the 180 C. P. S.

light modulator only the 20 C. P. S. frequency is recorded the 380 C. P. S. frequency is too high to be recorded on the slow moving film and when the 200 C. P. S. tone frequency is modulated by the 210 C. P. S. light modulator only the 10 C. P. S. frequency is recorded. These beat frequencies of 20 C. P. S. and 10 C. P. S. are recorded on two different tracks on the film, namely the tracks of film passing under the 180 C. P. S. and 210 C. P. S. light modulators respectively and each of these tracks are divided into three sub-tracks. When a beat frequency is recorded the maximum transparency of the film passes from sub-track to sub-track at the beat frequency speed and if such passing from sub-track to sub-track is in one direction (such as 1, 2, 3,) the beat frequency will be added to the modulator frequency (and as 20+180=200) and if the passing is in the other direction (such as 3, 2, 1) the beat frequency will be subtracted from the modulator frequency (such as 210—10=200). These two reproduced frequencies of 200 C. P. S. are not only of the same frequency but are also in phase so that they will act accumulatively on the loudspeaker diaphragm.

Stating this more briefly, in making the recording only the difference beat frequency is recorded and this is recorded on three film strips which are light modulated at the same modulator frequency but displaced 120 harmonic degrees in phase. Since the sound frequency is assumed to be different than the modulator frequency maximum light shifts progressively from one to another of the film sub-track causing corresponding film exposures. The beat frequency recording causes maximum light transmission to shift from modulator to modulator upon reproduction and if the direction of shifting is successively in the direction toward advanced phase modulators then the frequency of the sound reproduced is higher than the modulator frequency, but if this shifting is successively toward lagging phase modulators then the sound produced is of a lower frequency than the modulator frequency. It is thus seen that only one, namely the original, frequency is reproduced.

Possibly this can be made still more clear by restating this in somewhat different terms. Each complex sound wave may be resolved into two or more sine waves. These sound waves may of course be converted to light waves as is evident from applicant's disclosure. The purpose of the invention is to make records of extremely low frequencies so the recording of beat frequencies has been resorted to. However, each time a sine wave is beat by another sine wave both a sum and a difference beat frequency is obtained. Since many successively lighter frequency modulators are employed each sound frequency is modulated by both the nearest higher and the nearest lower modulating frequency. In each case only the difference beat frequency is recorded because the summation frequency is too high to be recorded on slow moving tape. In one case the sound frequency is higher than the modulating frequency and in the other case the sound frequency is lower than the modulating frequency. In both cases the beat frequency will be low but in one case the shifting of the heavy exposure on the film will be successively toward the advance phase modulator whereas in the other case the shifting of the heavy exposure film track will be successively toward the lagging phase modulator. Upon reproduction this will work out in such a way, due to the specific direction of beat frequency rotation, that the original frequency only will be made manifest. In other words before recording the beat frequency created will be a difference beat frequency whereas after reproduction and second modulation it may be either a difference of a sum frequency. Using, for example, the same frequencies, as above, if a 200 C. P. S. sound frequency is modulated by 180 C. P. S. and 210 C. P. S. modulating frequencies only difference beat frequencies of 20 C. P. S. and 10 C. P. S. will be obtained and after recording and reproduction these beat frequencies will be modulated by modulating frequencies of 180 C. P. S. and 210 C. P. S. respectively. Since in one case the sound frequency was higher than the modulating frequency and in the other case the sound frequency was lower than the modulating frequency the beat frequencies will shift the heavy exposures on the film toward advanced phase and toward lagging phase, respectively, as a result of which summation and difference beat frequencies will result upon reproduction. The net result is 20 C. P. S. will be added to modulator frequency 180 C. P. S. and 10 C. P. S. will be subtracted from modulator frequency 210 C. P. S. making both the original 200 C. P. S. sound frequency and both of these reproduced sound frequencies will be in phase and will act accumulatively on the loud speaker.

Since any sound can be regarded as a superposition of simple sinusoidal vibrations, it is clear that a complex sound will be reproduced in essentially the same way as a simple sinusoidal disturbance.

Referring again to Figs. 1, 2 and 3, one of the spools $SP_1$ and $SP_2$ is preferably driven through the medium of the motor M, whereas the other is allowed to unroll through the medium of a slip brake in accordance with well known movie camera and projector practice. Also, as conventionally shown by the spiral gear 25, shown on shaft 23 in Fig. 2, and the spiral worm 20*a* cut into shaft 20, the shaft 20 is driven by the shaft 23 but at a much higher speed as more fully pointed out hereinafter. Since many of the elements of the reproducer of Fig. 4 are identical to corresponding parts of the recorder Figs. 1, 2 and 3 these common elements have been assigned like reference characters. In this connection, it may be pointed out that the entire lens system has been provided to economize in the use of light and the entire lens system may be omitted from both the recorder and the reproducer, if desired, if the apparatus is otherwise designed to have each sound track of the modulator wheel cooperate with the corresponding sound track on the film. It should, however, be borne in mind that in this case the modulator MD, the film F and the plate IP should be in close proximity to each other and the light source NL or L should be some distance away so that all light rays are substantially parallel. Such a construction for the recorder has been shown conventionally, and on an enlarged scale, in Fig. 7. In this construction the semi-opaque photographic deposit is located on that side of the modulating disk nearest the slotted plate IP and nearest the film F.

*More specific description and operation*

It should be understood that the so-called cylindrical lens CL of Fig. 1 preferably has one of its external surfaces slightly curved at a right angle to its main curvature to give it the effect of an astigmatic lens such that the line of light passing through the modulator disk MD derived from lamp NL will be equally distributed along a line focus and as directed by lens CL will fall on the slit $IP_1$ of plate IP in a manner such that an image of the modulator disk portion through which this line of light passes will fall upon film F along a line defined by slit $IP_1$. In other words, each point along this line on modulator disk MD will be photographed at a corresponding point along a cross-wise line on film strip F.

It will be observed that the reproducer of Fig. 4 has two substantially cylindrical lenses $CL_1$ and $CL_2$. These lenses are preferably so constructed that lens $CL_1$ causes an equal distribution of light along the slit $IP_1$ and so that lens $CL_2$ causes all of the light that passes through the line-of-light in modulator disk MD to fall on the photocell PC. It should be understood that these restrictions are not necessarily adhered to in that any inaccuracy of light distribution in the recorder may be compensated for by an inverted unequal distribution of light along the line-of-light of the reproducer. The lenses $SL_1$ and $SL_2$ are of course used to transmit an image of a line-of-light from the modulator disk to the slit of the recorder and from the slit to the modulator disk in the reproducer, as the case may be. The slit will in practice be made very narrow, say one thousandth of an inch wide, and the film speed is preferably such that a slit-width of film will pass the slit during each revolution of the modulator disk. By this construction an average light intensity will be photographed on the film, and the original frequency will not be recorded cyclewise. This is desirable in that the degree of average exposure of any one of three sub-tracks of a particular track on the film determines whether the frequency and phase characterized by this sub-track shall be reproduced at all, and if so, for what duration and to what intensity.

If the lowest frequency characterized by the modulator MD is X, say for example 30 cycles per second, then the frequency of the second and fifth track are 2X and 5X, respectively, and if 100 tracks are used the highest frequency characterized on the modulator disk is 100X, or say 3000 cycles per second. Also, if the shaft 20 rotates at 30 revolutions per second, as may be assumed, the slit width is one thousandth of an inch and since the speed of shaft 20 is 30 R. P. S. the film speed is about 108 inches per hour. This is merely illustrative and other values and dimensions may be used.

Obviously, many of the frequencies to be recorded will fall between frequencies characterized on the modulating disk MD. Let us assume, for example only, that a frequency falls just midway between two adjacent frequencies characterized on the modulating disk MD. Let us also assume that the modulator frequencies are 5X and 6X cycles per second and that the frequency to be recorded is 5½X cycles per second. It is readily seen that the phase of rotation from sub-track to sub-track of the track of the film having 5X mechanical modulations thereon will be at a rate of ½X cycle per second in one direction and that the phase shifting from sub-track to sub-track of the track on the film, lying in line with the 6X cycle per second modulation track of the modulation disk, will be at a rate ½X cycle per second in the opposite direction. When the film is played back by the reproducer this rotating or shifting from sub-track to sub-track of the heavier exposed part causes ½X cycle to be added to that produced by the 5X track of the modulation disk to produce a net of 5½X cycles per second and causes ½X cycle to be subtracted from that produced by the 6X track of the modulation disk to result in a 5½X cycle sound. The two sounds produced are not only of the same frequency but are also of the same phase and therefore will be cumulative and will be heard as a single 5½X cycle per second tone. Tones of other intermediate frequencies will be similarly recorded and reproduced.

When steady light passes through the recorder as is the case when no sound enters the microphone MC (Fig. 1) all of the sub-tracks will have the same extent of opaqueness, and this opaqueness extends throughout its entire length so exposed, as shown in Fig. 5. When such a film F is played back by the reproducer of Fig. 4, each sub-track will produce light fluctuations striking the photocell PC. This will, however, not result in any sound coming from the loud speaker LS because the three sound sub-tracks of each frequency track will neutralize each other in the same way that three vectors of equal length and equally spaced neutralize each other.

When a complex sound, such as the report from a gun, enters the microphone MC all frequencies will be recorded, but during reproduction all of these frequencies will neutralize each other until that crucial moment when all of these frequencies are in phase at which time the report of the gun will be heard. It is thus seen that a sound much shorter than the time of movement of the film past the slit can be recorded and reproduced.

It will be observed that the inner circular ring 26 of the modulating disk MD (Fig. 5) is not shaded in sinusoidal fashion as are the other sub-tracks. This ring is provided to allow some light to strike the film F without mechanical modulation. This will result in the recording of lower frequencies than that characterized by the inner modulator track I by the usual density variation exposure method.

In Fig. 8 has been illustrated a modified form of recorder or reproducer, as the case may be, in which the modulator comprises a transparent cylinder about which sound tracks have been photographed. For convenience, these sound tracks have not been shown specifically in that they are too narrow to be shown. When the apparatus shown in Fig. 8 is a recorder, the stationary element NLPC (meaning neon lamp or photoelectric cell) within the cylinder MC is a neon lamp, whereas it is a photoelectric-cell when the apparatus constitutes a reproducer. In all other respects, the apparatuses for recording and re-reproducing illustrated in Fig. 8 are identical. It will be observed that this element NLPC is supported by a bracket 30 fastened to a fixed support 31. The apparatus of Fig. 8 functions the same as the apparatus of Figs. 1–4.

In practising the invention, the circular sound tracks on the modulating disk MD, Figs. 1, 2, 3 and 4, or the cylindrical sound tracks on the modulating cylinder MC of Fig. 8 are placed thereon photographically. This is done so that the sinusoidal tracks may first be drawn on a large sheet of paper on a greatly enlarged scale and may thereafter be reduced photographically until the sinusoidal waves are almost of microscopic size. As illustrated in Fig. 6, each sound sub-track A, B, or C has its opaqueness very dense at its right-hand side and of substantially zero density at its left-hand side. This is as it should be in that since the modulating disk makes an entire revolution during the time an increment of film moves by the slot $1P_1$ the film will be exposed to light in accordance with the average light during the time of passing of the modulating disk by the slit. Also, since the right-hand portion of each sound sub-track of the film (see Fig. 6 and also left half of Fig. 5) is opaque to a greater extent than is the left-hand portion of the sound track there will be less exposure of the negative film and greater exposure of the positive film with respect to the right side made therefrom. In this connection, it should be understood that the negative film produced by developing the film exposed during recording may be used in the reproducer without the application of a reversion process because the sound emitted by the loudspeaker will be the same when a negative film or a positive printed therefrom is passed through the reproducer. The only difference is that in one case the loudspeaker diaphragm is moved in one direction and in the other case it is moved in the other direction at a particular instance of film and modulator disk passage.

From the foregoing it is apparent that in accordance with the present invention the sound waves themselves are not recorded but the best frequencies obtained when the sound waves are modulated by three phase displaced sound modulators are recorded photographically. If a large number of 3-phase modulators are employed, as is proposed, these beat frequencies will be very low and may be recorded very accurately on slow moving tape. Since not only beat frequencies are recorded but the direction of their rotation with respect to the direction of phase rotation of the 3-phase modulators are recorded the original frequency will be reproduced during play back whereas the imaginary complementary tones will be neutralized and cancelled. In this connection it should be remembered that where the particular frequencies to be recorded are not sine waves they may be resolved into a plurality of sine waves of different frequencies and that in this case all these sine waves will be recorded automatically by automatic resolution, and will be recorded at various sub-tracks on the film.

Some of the advantages of the sound recording and reproducing system of the present invention over other known systems are that long periods of sound emission can be recorded on a comparatively short piece of film and that the photographic principle is used which lends itself to more accurate recording of sound.

Having thus shown and described several forms of applicant's invention and having pointed out how the principles thereof may be extended, it should be understood that the forms shown and described are merely illustrative of a few forms the invention may take and it should be further understood that various changes, modifications and additions may be made without departing from the spirit or scope of the invention so long as these changes come within the scope of the following claims.

What I claim as new is:

1. The method of recording and reproducing sound which consists in resolving a sound wave into its various frequency components, in beating each frequency component with a closely frequency related frequency, in recording these beat frequencies each for its specific duration on a suitable record strip, and in reproducing these beat frequencies for such specific durations and again beating them at the same frequencies as the original frequencies from which they were obtained were beat to reproduce the aforementioned various frequency components each for its specific duration.

2. In combination, a recorder comprising means for converting sound waves to light waves, a mechanically driven modulator for separating said light waves into various beat frequencies, means for recording these light wave beat frequencies on a suitable record strip for their respective durations; and a reproducer including a mechanically driven modulator for producing specific frequency light waves for specific durations from a record strip on which a record has been made by said recorder, and means for converting such reproduced light waves into sound waves.

3. In combination, a recorder comprising means for changing sound waves into light waves, means for dividing such light waves into a large number of separate beams and for distinctively modulating each beam, and means for recording on separate tracks one track for each beam on a record strip the average light emitted by these light beams; and a reproducer including means for producing light beams from such record strip one beam for each track, means for distinctively modulating each light beam so produced, and means for combining all of these modulated light beams into a single complex modulated light stream and converting such light stream into an audible electric current.

4. In combination, a recorder including means for converting sound waves into a plurality of light beams three for each of a plurality of frequencies, modulating means for each light beam for mechanically modulating such beam the three modulating means for each frequency having their modulating cycles displaced in phase to an extent of one third cycle, photographing means for recording individually on separate tracks of a film strip each of the various light beams modulated both mechanically and in accordance with sound waves; and a reproducer including means for creating a varying light beam for each track as the film strip is passed through the reproducer, modulating means for modulating each of the light beams so reproduced at relatively the same frequency as the frequency at which the light beam recorded on such track was mechanically modulated by the recorder, the modulating cycles of the three tracks of the modulating means for each frequency being displaced one-third cycle, means for combining all of such light beams, means for detecting variations of intensity of the combined light beam to produce a correspondingly varying current, and means for converting said current into sound.

5. A system for recording and reproducing sound comprising; a recorder including a microphone, an amplifier, for amplifying the current produced by said microphone means for converting current fluctuations from said amplifier into corresponding light fluctuations, means for separating the light fluctuations into a plurality of light beams and for further modulating certain light beams at specific and different frequencies, a film strip, and means for recording the average light emitted by such modulated light beams on separate tracks on said film as said film is passed through said recorder; and a reproducer including means for moving the film on which a record has been made thereon by said recorder by an opening through which steady light passes to produce a plurality of light beams of varying intensity, means for modulating each produced light beam at a frequency corresponding to the frequency at which the light beam recorded on the corresponding track on such film was modulated at the time it was recorded, means including a photo-electric cell for combining all of these modulated reproduced light beams and impinging them upon such photo-electric cell, means for amplifying the current produced by said photo-electric cell, and a loudspeaker controlled by the amplified current.

6. A system for recording and reproducing sound comprising; a recorder including a microphone, an amplifier for amplifying the current generated by said microphone, means for converting current fluctuations delivered from the output of said amplifier into light fluctuations, means for separating the light fluctuations into a plurality of light beam groups each including a plurality of beams, modulating means for modulating each group of light beams to a different frequency and each beam of the same group to the same frequency but displaced in phase with respect to other beams of the same group so that the net modulation of each whole group is zero, a film strip, and means for recording the average light emitted by the respective light beams on separate tracks of said film as said film is passed through said recorder; and a reproducer including means for moving a film on which a record has been made thereon by said recorder by passing such film crosswise of a slit through which steady light normally passes whereby a plurality of light beams of varying intensity are produced, means for modulating each light beam to the same frequency and phase that the light beam was specially modulated that produced the corresponding sound track on the film, means including a photo-electric cell for combining all of these modulated reproduced light beams and impinging them on such photo-electric cell, amplifying means for amplifying the current produced by said photo-electric cell, and a loudspeaker controlled by the current delivered by said amplifying means.

7. A system for recording and reproducing sound photo-electrically on and from a photosensitive film comprising; means for converting sound into a plurality of modulated light beams, means for analyzing said light beams by modulating them as to frequency and phase and thereby obtaining zero and extremely low beat frequencies, and means for recording these zero and extremely low beat frequencies on a slow moving photo-sensitive film; and a reproducer including means for producing a plurality of light beams one for each zero and extremely low beat frequency, means for modulating each light beam so produced by said reproducer at the same frequency that the original light which created the record was modulated, and means including a photo-electric cell for combining all of the reproduced light beams and impinging them on said photo-electric cell, and a loudspeaker controlled by the current delivered by said photo-electric cell.

8. The method of recording and reproducing sound which resides in converting sound waves into recordable oscillations, in modulating these recordable oscillations so as to produce multiphase beat frequencies for each modulating frequency such that the phase displacement between these beat frequencies for each modulating frequency results in a beat frequency of a frequency and direction of phase rotation dependent on both the original sound frequency and the frequency of modulation, in recording short period averages of these beat frequencies one record for each frequency and phase, and in reproducing the original sound waves by modulating each reproduced beat frequency at the same frequency and phase as the original recordable oscillations from which the beat frequency was created was modulated.

9. The method of recording and reproducing sound which resides in converting sound into electric current fluctuations, in converting said current fluctuations into light fluctuations, in modulating these light fluctuations at various frequencies each frequency at a number of phases so as to produce multiphase light beat frequencies such that the net unbalance between these beat frequencies results in a beat frequency of phase rotation dependent on both the original frequency and the frequency and phase of modulation, in recording these beat frequencies one record for each phase, and in reproducing the original sound by modulating the reproduced beat frequencies at the same frequency and phase as the corresponding original light fluctuations converted from sound frequencies were modulated.

10. The method of recording and reproducing sound consisting of a multiplicity of sound frequencies, which resides in modulating these sound frequencies at a plurality of frequencies and phases each modulating frequency occurring a number of times with different phases of which each group of like modulating frequencies are so phase displaced that their net modulation of a zero frequency medium is zero, in recording the beat frequencies obtained by so modulating said sound frequencies, in reproducing these beat frequencies and in again modulating each beat frequency at the same frequency and phase with which the original sound frequency was modulated to create such recorded and reproduced beat frequency.

11. The method of recording and reproducing sound consisting of a plurality of sound frequencies which consists in modulating these original sound frequencies at a plurality of modulating frequencies so as to produce both summation and difference beat frequencies, each difference beat frequency occurring several times with different phases the phases of these beat frequencies being related to each other to define one sence of phase rotation if the original sound frequency was greater than the modulating frequency and an opposite sence of phase rotation if the original sound frequency was lower than the modulating frequency, in recording only said difference beat frequencies, in reproducing said difference beat frequencies, in modulating each of said reproduced difference beat frequencies at the same modulating frequency as the original sound frequency was modulated to produce such beat frequency before it was recorded and further in a manner so that summation frequencies will be produced in response to this second modulation only if the original sound frequency was higher than its modulating frequency and so that a difference frequency will be produced from the reproduced difference beat frequency by such second modulation only if the original sound frequency was lower than its modulating frequency.

12. The method of recording and reproducing a signal consisting of a plurality of frequencies which resides in modulating these signal frequencies at a plurality of groups of successively higher modulating frequencies of which each group of modulating frequencies are of the same frequency but differing in phase, in recording only the difference beat frequencies so created, in reproducing such difference beat frequencies, in again modulating each difference beat frequency at the same frequency and phase as the signal frequency from which it was created was modulated before recording as a result of which only the initial signal frequencies are reproduced.

13. A system for recording and reproducing sound consisting of a multiplicity of frequencies comprising, a recording tape, a plurality of modulating devices each modulating at a different frequency and each modulating device comprising a plurality of modulators which modulate the sound frequencies at the same frequency but at different phases such that the net modulation of each modulating device upon a constant medium is zero, means for recording the resulting difference beat frequencies on said tape, reproducing means including means for passing the tape through said reproducing means to reproduce said difference beat frequencies, and means for modulating the reproduced difference beat frequencies each at the same frequency and phase as the original sound frequency was modulated to produce such difference beat frequency before its recording.

14. A system for recording and reproducing sound comprising, means for converting sound waves into light fluctuations, a recording tape, modulating means for modulating the light at a plurality of groups of frequencies of which the modulating means of each group modulates light at the same frequency and phase displaced so that the net modulation of steady light is zero, means for recording the difference beat frequencies but not the sum beat frequencies created by such modulation of the light on said recording tape, means for reproducing said difference beat frequencies from said tape, means for modulating each difference beat frequency at the same frequency and phase as that at which the light from which it was created was modulated prior to its recording, and means for converting the resultant light frequencies into sound.

15. A system for recording and reproducing sound consisting of a plurality of sound frequencies comprising, means for modulating said sound frequencies at a plurality of modulating frequencies in a manner so as to result in the production of difference beat frequencies having characteristics which distinguish from each other like beat frequencies obtained by modulating sound frequencies that were respectively higher and lower to the same extent than the modulating frequency used in creating them, a recording medium, means for recording said difference beat frequencies on said recording medium, means for reproducing said difference beat frequencies from said recording medium, means for modulating each of said reproduced difference beat frequencies at the same modulating frequency as that at which the sound frequency from which it was created was modulated before its recording and also in a manner such that a summation frequency only will be produced when the beat frequency resulted from modulating a sound frequency by a lower modulating frequency and a difference frequency will only be produced when the beat frequency resulted from modulating a sound frequency by a higher modulating frequency.

16. A system for recording and reproducing sound consisting of a plurality of sound frequencies, means for modulating said sound frequencies at a plurality of groups of modulating frequencies of which each group is of a different frequency from the frequency of other groups and of which all frequencies of each group are of the same frequency but displaced in phase from adjacent frequencies of the same group to that part of a cycle as there are frequencies in that group, means for recording the difference beat frequencies so created, means for reproducing said beat frequencies, and means for again modulating each frequency reproduced at the same frequency and phase as that at which a sound frequency was modulated to produce such beat frequency.

17. The method of recording and reproducing sound which resides in resolving a sound wave into a plurality of closely frequency related groups of frequencies, in modulating each of these groups of frequencies at a closely frequency related modulating frequency to obtain beat frequencies and in a manner so that difference beat frequencies of the same frequency which are derived by modulating a sound frequency that is higher by a predetermined number of cycles than the modulating frequency and a sound frequency that is lower by the same predetermined number of cycles than the modulating frequency are distinctively retained, in recording only the difference beat frequencies on separate portions of a record tape, in reproducing these difference beat frequencies from such record tape, and in again modulating each of these difference beat frequencies at the same frequency and in the same manner as the original sound frequency from which such beat frequency was created was modulated before the recording.

18. A recorder for recording sound comprising, means for converting sound waves into light of fluctuating intensity, a photosensitive recording tape, a modulating means consisting of a series of groups of modulator channels each channel including a modulator member each member of a group modulating the intensity of the light passing through its channel at a frequency characteristic of the group but differing in phase from other members of the group the phase differences of the various members of the group being so chosen that the net mean light intensity transported through the sum of the channels of a group is constant, recording means including means for moving said tape by an aperture in which light in said channels is caused to fall on an increment of said tape for a period of time during its movement sufficiently long to average out the sum frequencies produced in a channel by such modulation and sufficiently short to allow difference beat frequencies to appear as fluctuation in exposure intensity of the part of the tape exposed to the light passing through such channel.

19. Sound reproducing means for producing sound from a tape on which difference beat frequencies have been recorded on separate traces the traces being divided into groups each group of traces having recorded thereon difference beat frequencies from a common modulating frequency acting on the original sound frequencies which modulating frequencies differed in phase and produced beat frequencies differing in phase with respect to each other and bearing relations with respect to each other such as to characterize the original frequency as to whether it was higher or lower than the modulating frequency for that group, such sound reproducing means comprising a light source, means for causing such tape to pass by an aperture in said reproducing means, means for directing light from said source through said aperture onto said tape, a light modulating means for converting the beat frequencies recorded on said tape into new frequencies of light fluctuating intensity, and means for converting such light fluctuating intensities into sound waves.

ROBERT H. DICKE.

REFERENCES CITED

The following references are of record in the file of this patent:

UNITED STATES PATENTS

| Number | Name | Date |
| --- | --- | --- |
| 1,753,961 | Zworykin | Apr. 8, 1930 |
| 1,809,070 | Schapiro | June 9, 1931 |
| 1,968,977 | Wainwright | Aug. 7, 1934 |
| 2,086,833 | Walton | July 13, 1937 |
| 2,228,782 | Sharples | Jan. 14, 1941 |
| 2,403,983 | Koenig | July 16, 1946 |
| 2,403,985 | Koenig | July 16, 1946 |
| 2,425,003 | Potter | Aug. 5, 1947 |